(12) United States Patent
Park et al.

(10) Patent No.: US 9,379,801 B2
(45) Date of Patent: Jun. 28, 2016

(54) METHOD AND DEVICE FOR TRANSMITTING AND RECEIVING MULTI-INPUT MULTI-OUTPUT (MIMO) SIGNAL IN WIRELESS COMMUNICATION SYSTEM IN WHICH PLURAL COMMUNICATION SYSTEMS ARE PRESENT

(71) Applicant: LG ELECTRONICS INC., Seoul (KR)

(72) Inventors: Sungho Park, Anyang-si (KR); Kyujin Park, Anyang-si (KR); Jiwoong Jang, Anyang-si (KR); Hangyu Cho, Anyang-si (KR); Jiwon Kang, Anyang-si (KR); Dongcheol Kim, Anyang-si (KR); Dongguk Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/407,906

(22) PCT Filed: Jun. 17, 2013

(86) PCT No.: PCT/KR2013/005308
§ 371 (c)(1),
(2) Date: Dec. 12, 2014

(87) PCT Pub. No.: WO2013/187741
PCT Pub. Date: Dec. 19, 2013

(65) Prior Publication Data
US 2015/0139344 A1 May 21, 2015

Related U.S. Application Data

(60) Provisional application No. 61/659,979, filed on Jun. 15, 2012.

(51) Int. Cl.
*H04B 7/02* (2006.01)
*H04B 7/06* (2006.01)
(Continued)

(52) U.S. Cl.
CPC ............ *H04B 7/0634* (2013.01); *H04B 7/0413* (2013.01); *H04B 7/0626* (2013.01); *H04B 7/0632* (2013.01); *H04L 25/0204* (2013.01); *H04W 48/16* (2013.01)

(58) Field of Classification Search
CPC ...... H04B 15/02; H04B 7/0413; H04B 7/086; H04B 7/0619; H04L 1/06; H04L 2025/03426; H04L 25/0204; H04L 25/03006
USPC .................... 375/346, 299, 267; 370/334, 252
See application file for complete search history.

(56) References Cited

U.S. PATENT DOCUMENTS 6,487,603 B1 * 11/2002 Schuster et al. .............. 709/231
2008/0166974 A1 7/2008 Teo et al.
(Continued)

FOREIGN PATENT DOCUMENTS

WO WO 2012036640 * 3/2012

OTHER PUBLICATIONS

PCT International Application No. PCT/KR2013/005308, Written Opinion of the International Searching Authority dated Oct. 18, 2013, 8 pages.
(Continued)

*Primary Examiner* — Leila Malek
(74) *Attorney, Agent, or Firm* — Lee, Hong, Degerman, Kang & Walmey; Jonathan Kang; Michael Monaco

(57) ABSTRACT

A device for transmitting and receiving multi-input multi-output (MIMO) signal in a wireless communication system in which a plurality of communication systems is present includes a plurality of antenna modules and a recognition module for recognizing at least one of network information or antenna information of a source device. The recognition module compares a measurement result of the plurality of antenna modules with pre-stored information to recognize the network information or antenna information of the source device.

5 Claims, 5 Drawing Sheets

(51) Int. Cl.
  *H04B 7/04* (2006.01)
  *H04W 48/16* (2009.01)
  *H04L 25/02* (2006.01)

(56) References Cited

U.S. PATENT DOCUMENTS

2009/0052570 A1   2/2009   Haykin
2009/0156227 A1   6/2009   Frerking et al.
2011/0021167 A1   1/2011   Shellhammer
2012/0052827 A1   3/2012   Sadek et al.
2013/0215876 A1*  8/2013   Santos et al. ............ 370/338
2013/0259109 A1* 10/2013   Liu et al. ................. 375/227

OTHER PUBLICATIONS

PCT International Application No. PCT/KR2013/005308, Written Opinion of the International Searching Authority dated Oct. 18, 2013, 1 page.

* cited by examiner

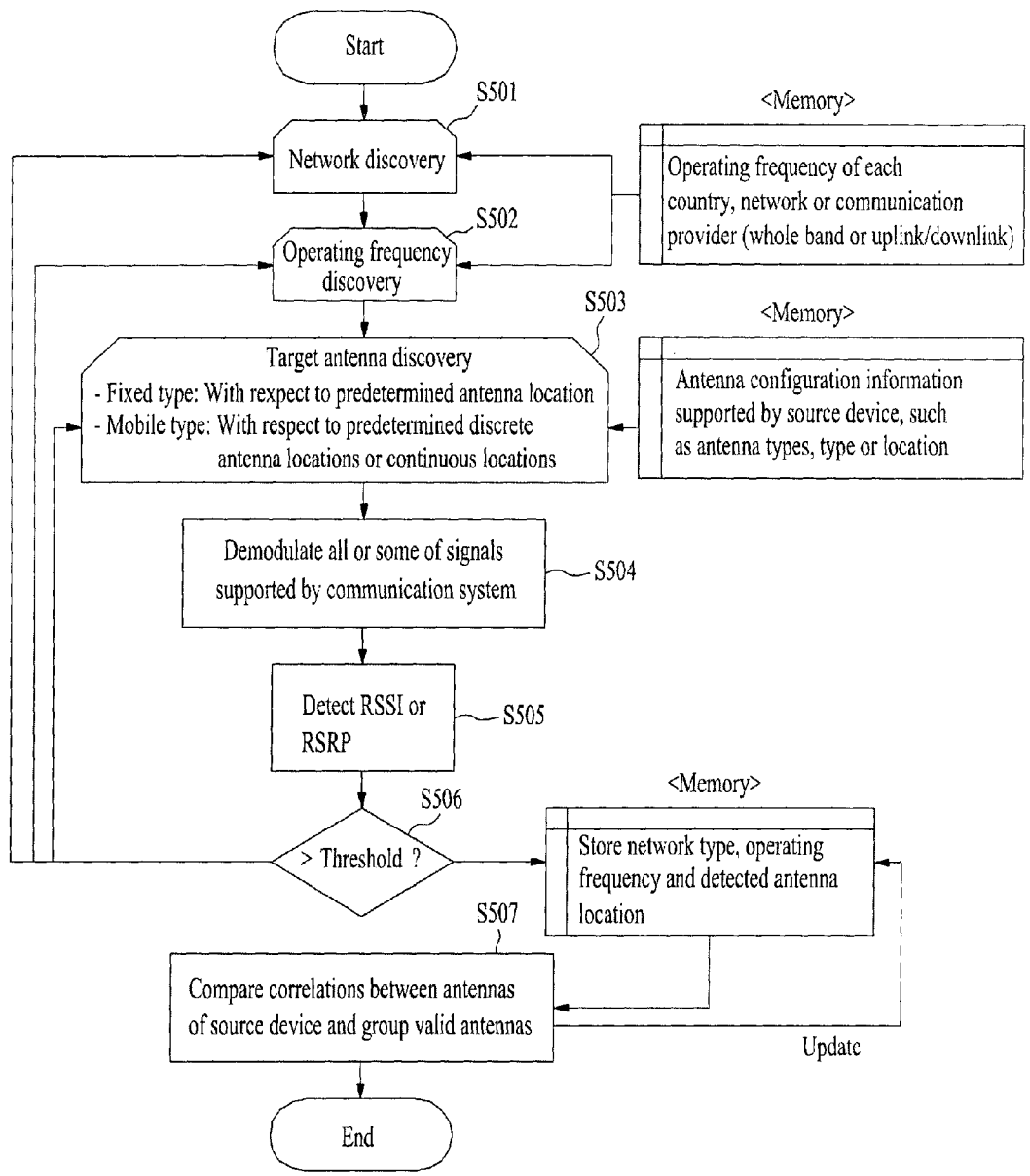

METHOD AND DEVICE FOR TRANSMITTING AND RECEIVING MULTI-INPUT MULTI-OUTPUT (MIMO) SIGNAL IN WIRELESS COMMUNICATION SYSTEM IN WHICH PLURAL COMMUNICATION SYSTEMS ARE PRESENT

CROSS-REFERENCE TO RELATED APPLICATIONS

This application is the National Stage filing under 35 U.S.C. 371 of International Application No. PCT/KR2013/005308, filed on Jun. 17, 2013, which claims the benefit of U.S. Provisional Application Ser. No. 61/659,979, filed on Jun. 15, 2012, the contents of which are all hereby incorporated by reference herein in their entirety.

TECHNICAL FIELD

The following description relates to a wireless communication system and, more particularly, to a method and device for transmitting and receiving a multi-input multi-output (MIMO) signal in a state in which a plurality of communication systems is present.

BACKGROUND ART

Currently, various communication standards such as Bluetooth, ZigBee, Wi-Fi, Wi-Fi direct, etc. as well as a cellular communication function are being applied to various digital devices. That is, communication functions are being added to most digital devices due to user requirements to freely exchange data anytime and anywhere according to service kinds regardless of coverage/device kind.

Another user requirement is high-rate data transmission. Traditionally, data transfer rate was a most the important performance requirement in wired/wireless communication and various attempts to improve data transfer rate have been conducted. In particular, in a wireless environment, environmental conditions inferior to a wired environment, such as user movement speed, presence of obstacles, channel environment related to distribution of obstacles, path loss according to distance, resource assignment in a time/frequency domain, etc., must be considered.

As one method for compensating for long-term fading such as path loss or shadowing, it is to minimize a distance between a source device and a destination device. In general, the relationship between path loss and distance is expressed in the form of an exponential function. In addition, as distance between source device and destination device increases, probability that an obstacle is present between the source device and the destination device increases.

As a method of solving short-term fading due to Doppler spread according to mobility and multipath delay spread, a multi-input multi-output (MIMO) scheme may be used. In this scheme, a scheme of using a plurality of antennas in a transmission device and/or a reception device to obtain beam gain using an antenna array, a transmit diversity scheme of simultaneously transmitting a single data stream via multiple channels to improve data transmission and reception reliability, a spatial diversity scheme of transmitting multiple data streams via different channels to increase channel capacity, etc. may be used. Although the MIMO scheme was conventionally applied to only Wi-Fi, cellular communication, etc., the MIMO technology is now expanding to new applications.

However, in the above-described schemes and functions, the MIMO scheme is not applied to most low-power wireless communication systems or a transmission device and a reception device must know mutual antenna configuration information in even a communication system to which the MIMO scheme is applied. This is because the MIMO scheme is generally applied given known configuration information including the number of antennas of the transmission device and the reception device (or in a state in which antenna configuration information can be confirmed through predetermined information exchange). In addition, device restrictions according to antenna design and deployment influence application of MIMO technology. As another problem, network types and bandwidths supported by the transmission device and the reception device match. That is, when the transmission device and the reception device support one or more communication systems, the network types and operating bandwidths currently applied to both devices must match. This problem may be internally solved when identical systems are used in both devices. However, if different systems are used in both devices, a separate network detection scheme needs to be applied or information about a network must be directly input by a user. Such problems will be described in detail with reference to FIG. 1.

FIG. 1 shows an example in which two devices supporting various communication systems communicate with each other. In FIG. 1, A, B, C and D indicate Wi-Fi, Bluetooth, Global System for Mobile Communications (GSM), LTE communication systems, respectively. In the example of FIG. 1, a source device supports all four communication systems, but a destination device supports only Wi-Fi, GSM and LTE communication systems. In the case of communication using Wi-Fi and GSM, the source device performs transmission/reception using a single antenna and the destination device performs transmission and reception using two antennas. If a multi-band antenna is applied due to limited device size, GSM and LTE may share antennas. That is, the source device may use one of the two antennas for LTE as an antenna for GSM and the destination device may share two antennas for LTE and GSM. In case of LTE, the source device and the destination device perform transmission/reception using both antennas. In case of Bluetooth, since only the source device has a Bluetooth module, communication between the source device and the destination device through Bluetooth is impossible.

Referring to FIG. 1(b-1) which shows direct communication between the source device and the destination device in a MIMO scheme, in direct communication between the devices using Wi-Fi, since the source device has only one antenna, only a receive diversity scheme of the destination device may be considered (if a relationship between the source device and the destination device is changed, only a transmit diversity scheme may be considered). Although direct transmission between devices in a cellular system, such as GSM or LTE, is not currently supported, a radio frequency (RF) signal amplifier may be considered. In this case, since a method of sharing information regarding antennas and networks between devices is not currently supported, access is possible in a method similar to Wi-Fi. In the example of FIG. 1(b-1), in case of GSM, since the destination device uses one antenna for GSM and the source device uses two antennas for GSM, only a receive diversity scheme of the destination device may be considered. In addition, in case of LTE, since each of the destination device and the source device has two antennas for LTE, a transmit/receive diversity scheme may be used. In case of cellular communication, only a scheme capable of performing transmission/reception even in a state in which a device does not know a transmission scheme/antenna configuration of a counterpart device may be used.

In FIG. 1, from the viewpoint of operating bandwidth, since a cellular system does not support control information exchange between devices yet, the device may not know information regarding operating bandwidth. Accordingly, the system needs to perform signal processing with respect to operating bandwidth.

MIMO systems must be deployed to meet demands for data transfer rate scheme. However, as in a cellular communication example of FIG. 1, if per-system antenna information and network information of each device is not known, an available MIMO scheme is very restrictive. Further, if multiple antennas are used, it is difficult to perform transmission of multiple streams and to solve interference between antennas.

For example, as shown in FIG. 2, if each of a source device and a destination device has two antennas and the source device transmits two streams ($s_1$ and $s_2$), it is difficult for the destination device to distinguish between the two streams due to interference ($s_2 h_{21}$ and $s_1 h_{12}$). In addition, it is also difficult to support rank adaptation for adaptively adjusting the number of streams transmitted between devices.

In particular, if near-field communication is considered in order to reduce long-term fading, interference between antennas shown in FIG. 2 may become severe, because performance sensitivity is significantly increased due to beam mismatch and antenna interference between two devices as a distance between the devices decreases.

FIG. 3 shows beam regions and interference influence between respective antennas of two devices and/or between antennas of each device, which may occur when the number of antennas, the locations of the antennas, etc. are not known in short-range communication between a source device and a destination device.

FIG. 3(a) shows beam regions and interference if a source device and a destination device have a similar antenna location and type/kind. As shown in FIG. 3(a), antennas #1 and #2 of the source device and the destination device have a high signal to interference plus noise ratio (SINR) because beam patterns thereof match.

FIG. 3(b) shows beam regions and interference if a source device and a destination device are different in at least one of antenna location and type/kind. In this case, antennas #1 and #2 of the source device and the destination device have an SINR relatively lower than that of FIG. 3(a) because beam patterns thereof do not match each other.

Such performance sensitivity may cause more severe problems if a terminal has multiple antennas. This is because mutual interference between antennas occurs or an SINR between antennas is changed according to relative position between the antennas of the source device and the antennas of the destination device. For example, assume that the antenna #1 of the source device and the antenna #1 of the destination device match but the antenna #2 of the source device and the antenna #2 of the destination device do not match. In this case, in downlink, a difference in channel gain (or path loss) between receive antennas of the source device is increased. Thus, it is difficult to perform transmission of high rank which is expected due to use of multiple receive antennas, that is, simultaneous transmission of multiple streams (or layers). In addition, space multiplexing effect, that is, reception stability increase obtained by combining signals received by a plurality of receive antennas having different channel properties is also reduced. Similarly, in uplink, since channel gain varies according to channel gain between transmit antennas of the source device, a probability that transmission of high rank is performed is reduced and transmit diversity is also reduced.

DISCLOSURE

Technical Problem

An object of the present invention devised to solve the problem lies in a method and destination device for recognizing antenna properties and frequency properties of a source device.

The technical problems solved by the present invention are not limited to the above technical problems and other technical problems which are not described herein will become apparent to those skilled in the art from the following description.

Technical Solution

The object of the present invention can be achieved by providing a device for transmitting and receiving a multi-input multi-output (MIMO) signal in a wireless communication system in which a plurality of communication systems is present including a plurality of antenna modules, and a recognition module for recognizing at least one of network information or antenna information of a source device. The recognition module compares a measurement result of the plurality of antenna modules with pre-stored information to recognize the network information or antenna information of the source device.

In another aspect of the present invention, provided herein is a method of transmitting and receiving a multi-input multi-output (MIMO) signal in a wireless communication system in which a plurality of communication systems is present including performing measurement with respect to a plurality of antenna modules, and comparing a measurement result with pre-stored information to recognize at least one of network information or antenna information of a source device.

The aspects of the present invention may include the following.

The pre-stored information may include at least one of antenna information including at least one of an antenna types applicable to the source device, antenna geometry, the number of antennas, an antenna location or antenna gain and network type applicable to the source device or frequency related information.

The frequency related information may include information about a frequency bandwidth and a center frequency according to a combination of two or more of country, communication provider or network type.

The antenna information may include at least one of antenna types, antenna geometry, number of antennas, antenna location and antenna gain.

The network information may include at least one of a network type or frequency related information.

The measurement result may be average received power of radio frequency signals received by the antenna modules.

The measurement result may be average received power of channel estimation signals included in radio frequency signals received by the antenna modules.

The device may further include a module for decoding or demodulating a baseband signal according to network type.

If the plurality of antenna modules is movable in the device, measurement of the plurality of antenna modules may be performed by moving the plurality of antenna modules to predetermined locations.

If the plurality of antenna modules is movable in the device, measurement of the plurality of antenna modules may be performed while moving the plurality of antenna modules.

The device may estimate information about receive antennas of the source device from at least one of the recognized network information or antenna information.

The device may determine an antenna module which will perform communication with the source device among the plurality of antenna modules from at least one of the recognized network information or antenna information.

Advantageous Effects

According to the present invention, it is possible to transmit a signal between a source device and a destination device utilizing different communication systems through a MIMO scheme. In addition, it is possible to minimize signal attenuation between the source device and the destination device and to optimize multi-antenna performance, by recognizing antenna information of the source device.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings:

FIGS. 4 and 5 are diagrams illustrating operation of a destination device including a recognition module according to an embodiment of the present invention.

BEST MODE

Figure 1:
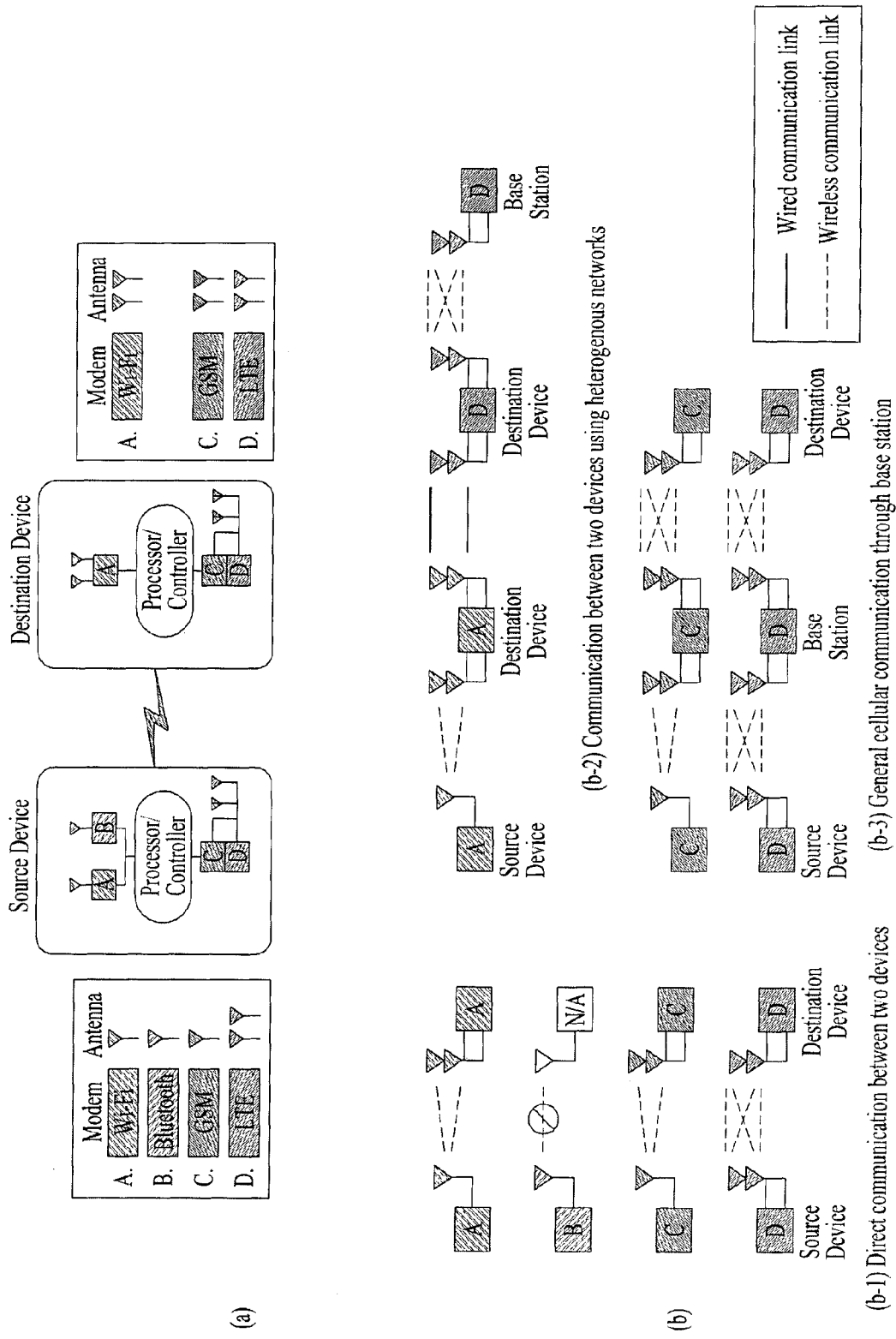
FIG. 1 is a diagram showing an example in which two devices supporting various communication systems communicate with each other.
Figure 2:
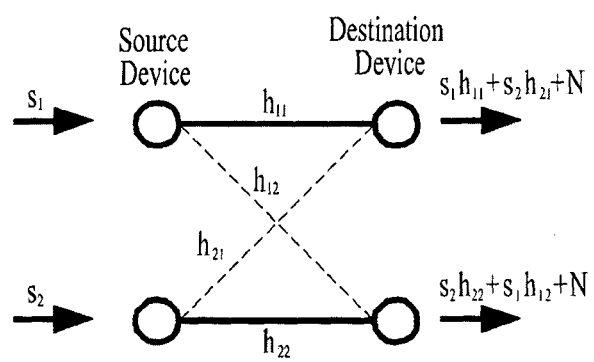
FIG. 2 is a diagram illustrating interference which may be generated when transmitting multiple streams.
Figure 3:
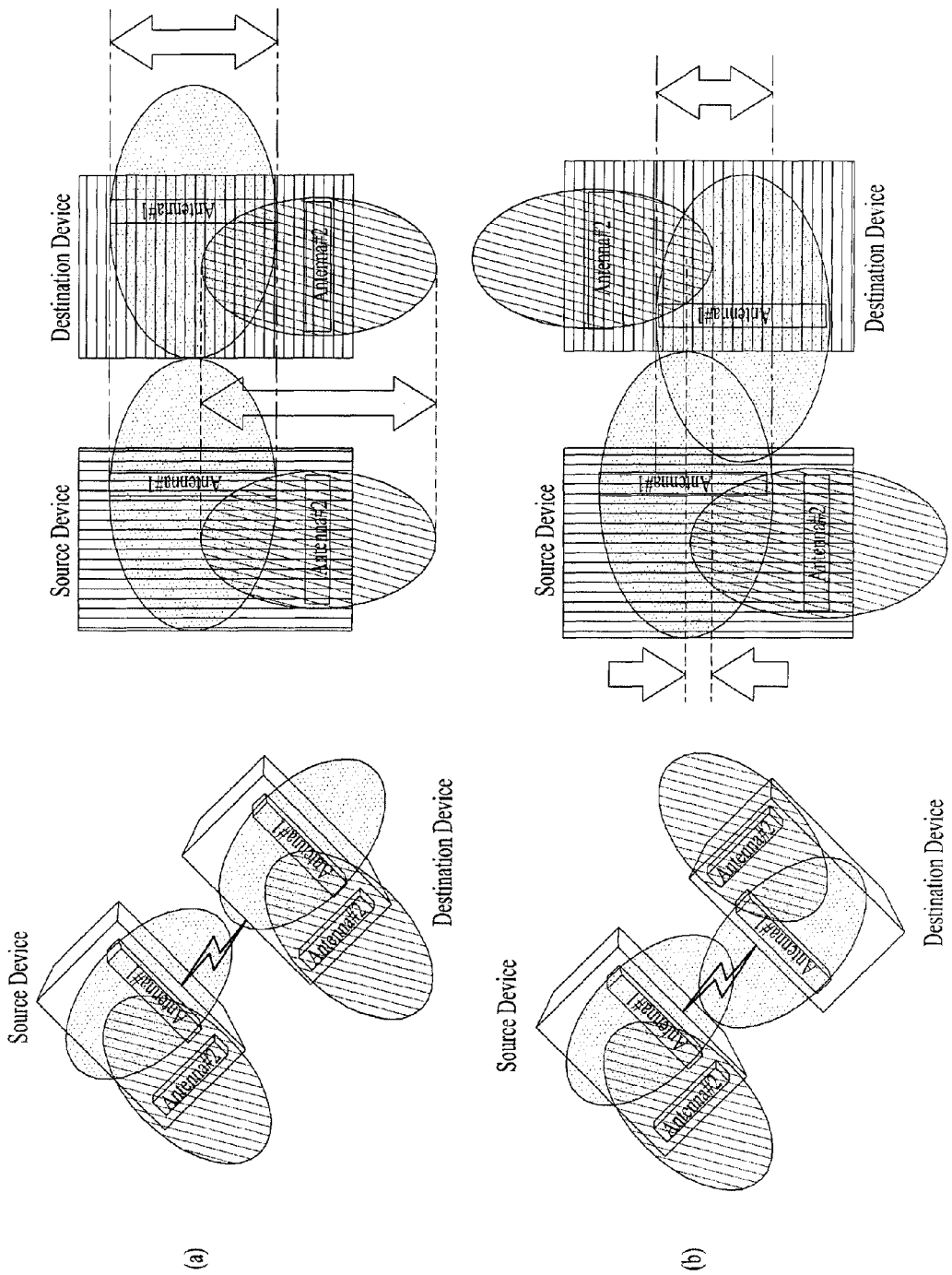
FIG. 3 is a diagram showing beam regions and interference influence between antennas over a short distance.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any one embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention and that the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as radio technology such as UTRA (Universal Terrestrial Radio Access) or CDMA2000. TDMA may be embodied as radio technology such as GSM (Global System for Mobile communications)/GPRS (General Packet Radio Service)/EDGE (Enhanced Data Rates for GSM Evolution). OFDMA may be embodied as radio technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. The 3GPP LTE employs OFDMA in downlink and employs the SC-FDMA in uplink. LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

Hereinafter, in the description of the present invention, as described above, a wireless communication system in which a plurality of communication systems (for example, LTE, GSM, Bluetooth, ZigBee, Wi-Fi, Wi-Fi Direct, etc.) is present, a method for recognizing antenna information, network information, etc. of a source device at a destination device in order to enable the source device and the destination device each having a plurality of antennas (modules) to perform communication using a MIMO scheme and a device therefor will be described. The destination device means a device which includes a function for intelligently recognizing antenna information, network information, etc. of the source device and can perform data transmission and reception after determining an antenna (module) for performing communication with a source device using a MIMO scheme based on the recognized information.

In the following description, the configuration and operation of the destination device according to the embodiment of the present invention will be described first and then the recognition module will be described in detail.

Configuration and Operation of Destination Device

The destination device according to the embodiment of the present invention uses at least one of various communication systems (network types) and recognizes at least one of network information or antenna information of a source device that performs MIMO transmission using the number and locations of specific antennas.

The destination device according to the embodiment of the present invention may include a plurality of antennas (modules) and a recognition module for recognizing at least one of network information or antenna information of a source device.

The plurality of antenna modules of the destination device may receive a signal from the source device. If one network/communication system (a cellular system such as GSM, CDMA, HSPA, LTE or LTE-A, Wi-Fi, GPS, etc.) supports multiple bands, the plurality of antenna modules may support multiple bands. The destination device according to the embodiment of the present invention may share antenna modules with respect to each communication system. That is, the antenna modules of the destination device may enable a cellular system such as GSM or LTE/LTE-A and a communication system such as Wi-Fi or Bluetooth to share common multi-band antennas.

The destination device may recognize at least one of the network information or antenna information of the source device using a non-contact-active recognition method, a non-contact-passive recognition method or a contact recognition method.

The network information may include communication network type/kind used by the source device, frequency related information, etc. The network type/kind may include GSM/CDMA/HSPA (FDD)/LTE (FDD/TDD)/LTE-A (FDD/TDD)/Wi-Fi/ZigBee/Z-wave/Bluetooth/GPS/DMB, etc. The frequency related information is related to operating bandwidth within a communication network of the source device and may include center frequency and operating bandwidth or uplink/downlink bandwidth. In addition, the frequency related information may be information of each country, communication provider, network type and duplex mode. For example, the frequency related information may be center frequency and operating bandwidth of each country, communication provider or network and examples thereof may be Korea/LG U+/LTE/FDD: 839 MHz to 849 MHz, 884 MHz to 894 MHz or Korea/LG U+/LTE/FDD: 1920 MHz to 1930 MHz, 2110 MHz to 2120 MHz. Another example of the frequency related information may be Korea/LG U+/LTE/FDD: 839 MHz to 849 MHz (UL), 884 MHz to 894 MHz (DL) or Korea/LG U+/LTE/FDD: 1920 MHz to 1930 MHz (UL), 2110 MHz to 2120 MHz (DL).

The antenna information may include at least one of antenna types (e.g., dipole antenna, etc.), antenna geometry (e.g., co-polarized ULA, cross-polarized ULA, etc.), the number of antennas (e.g., 2Tx, 2Tx-2Rx, 2Tx (V-pol 1Tx, H-pol 1Tx), 2Tx (V-pol 1Rx, H-pol 1Rx)-2Rx (V-pol 1Rx, H-pol 1Rx), etc.), antenna location (e.g., −10 mm, 30 mm from a reference point (a left upper end of an interface between a device including an intelligent device recognition module and the source device) and antenna gain (e.g., 3 dBi, 5 dBi, etc.)

Although described below, the recognition module may compare a signal measurement result from a source device, which is measured by each of the plurality of antenna modules, with pre-stored information to recognize network information or antenna information. The pre-stored information may be the above-described network information or antenna information. More specifically, for example, the destination device according to the embodiment of the present invention may store network type/kind and frequency related information of each country, communication provider, network type or duplex mode. In addition, the destination device may store antenna information that may be used in the source device.

Subsequently, the destination device of the present invention may determine an optimal antenna configuration of the source device from the network information and/or the antenna information of the source device, which is recognized through the recognition module and the plurality of antenna modules. That is, the destination device may determine antenna configuration for communication with the source device using a MIMO scheme based on the recognized network information and/or the antenna information of the source device.

Recognition Module—Non-Contact-Active Recognition Module

In the non-contact-active recognition method, the recognition module directly recognizes the network information and/or the antenna information of the source device using a signal transmitted from the source device via a radio channel. In the non-contact-active recognition method, the destination device includes a plurality of fixed antenna modules or mobile antenna modules, scans a network and the antennas of the source device through the antenna modules so as to determine an optimal antenna configuration for communication with the source device and to configure the network.

Here, the network information and/or the antenna information of the source device may be recognized by i) comparing a result of measuring receive power per antenna and pre-stored information or ii) comparing a result of measuring an electromagnetic field per antenna and pre-stored information.

Measurement of receive power per antenna may be measurement of average received power of RF signals received during a specific time with respect to the overall bandwidth of a specific network or (predicted) operating bandwidth of the source device. The RF signal may be an RF signal obtained only by removing a carrier or a signal obtained by removing both a carrier as well as pulse shaping filtering.

Alternatively, measurement of the receive power per antenna may be measurement of a digital baseband signal (that is, a signal obtained by demodulating or decoding an RF signal) received during a specific time with respect to the overall bandwidth of a specific network or (predicted) operating bandwidth of the source device. In this case, the source device or the recognition module needs to include a modem capable of demodulating/decoding a digital baseband signal with respect to all or part of a communication system and a channel estimation module. In addition, a signal to be demodulated/decoded may be, for example, a channel estimation signal of a reference signal, a pilot signal or a preamble signal. Exemplary digital baseband signals may include a sounding reference signal (SRS) or a cell-specific reference signal (CRS) in case of LTE.

Measurement of the receive power or electromagnetic field per antenna may be differently performed depending on which of the plurality of antenna modules included in the destination device is of a fixed type or a mobile type. If the plurality of antenna modules is of a fixed type, an appropriate antenna may be selected from among the plurality of antenna modules to measure receive power or an electromagnetic field. A mobile antenna module may continuously perform measurement while moving or perform measurement at predetermined locations.

Figure 4:
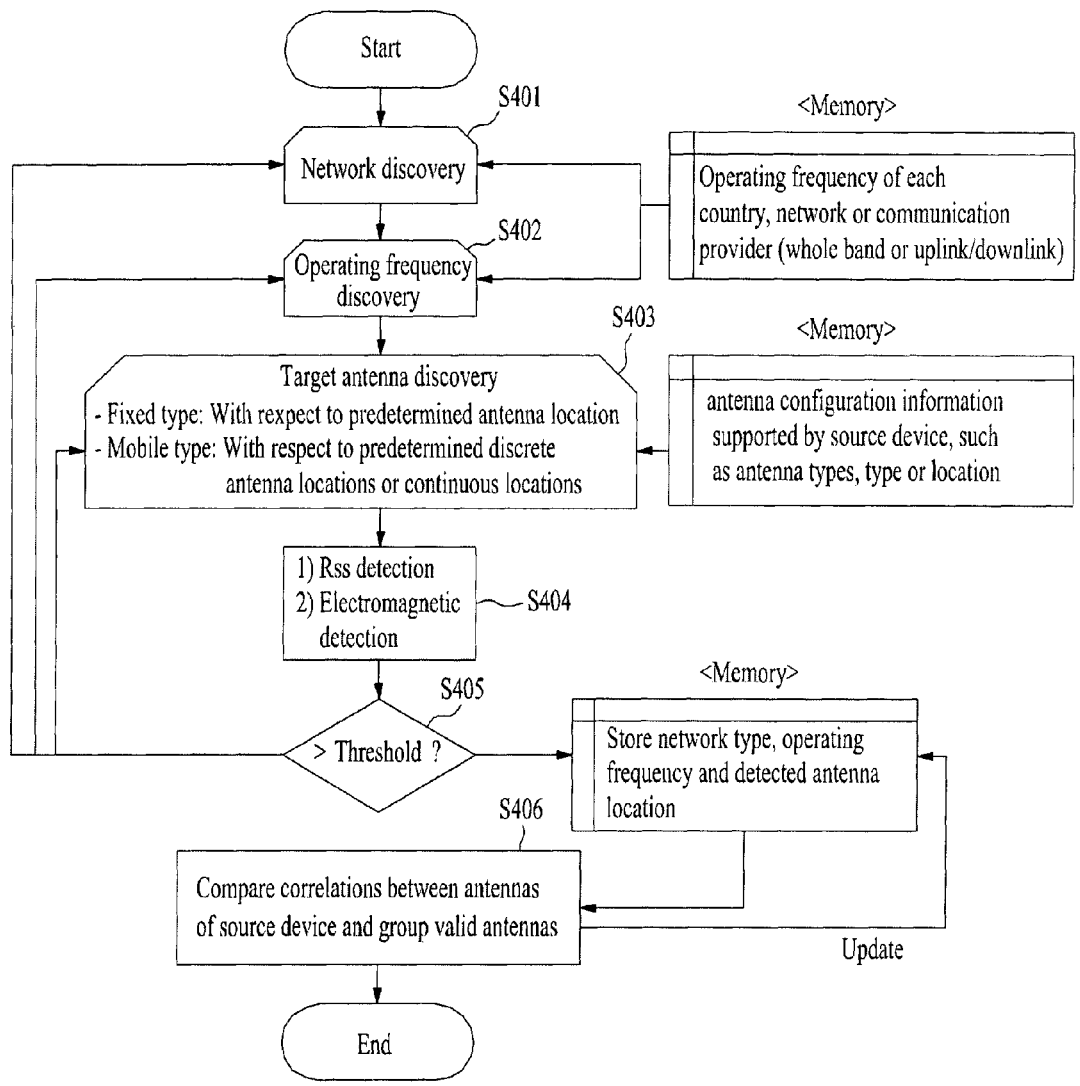

FIG. 4 shows operation of the destination device for measuring the average received power or electromagnetic field of the RF signal. Referring to FIG. 4, the recognition module retrieves information pre-stored for recognizing network type/kind, frequency related information and antenna information (information pre-stored for network and operating frequency discovery), that is, operating frequency per country, network or communication provider and information pre-stored for antenna discovery, that is, antenna configuration information such as antenna types, type, location of the source device, in steps S401 to S403. In step S404, the destination device may detect received signal strength (RSS) or an electromagnetic field of an RF signal at each of the plurality of antenna modules. In step S405, the result is compared with a threshold and information such as network type, if the result exceeds the threshold the operating frequency or the detected antenna location is stored in a memory. Thereafter, in step S406, correlations between the antennas of the source device may be compared to group valid antennas. The memories shown in FIG. 4 may be one memory. In addition, in the example of FIG. 4, the destination device may store information about candidate groups of the source for the network information and the antenna configuration in the memory in advance and compare the information with detection information, thereby improving detection accuracy.

FIG. 5 shows operation of the source device for measuring a digital baseband signal. Since the network information and/or the antenna information of the source device is recognized by measuring the digital baseband signal, refer to the description of FIG. 4 excluding step S504 of demodulating/decoding some or all of signals supported by the communication system and step S505 of detecting a received signal strength indicator (RSSI)/reference signal received power (RSRP) after demodulation/decoding.

In the above-described non-contact-active recognition procedure, the intelligent recognition procedure includes a method of directly detecting some information of the source device and indirectly estimating the other information based on the directly recognized information. For example, receive antenna information of the source device may be estimated based on a signal received from the source device, that is, detection information using an uplink signal. More specifically, through the non-contact-active device recognition method, it is possible to acquire transmit (Tx) antenna configuration information and network configuration information of the source device and to estimate receive (Rx) antenna configuration information of the source device based on the detected Tx antenna configuration information and network configuration information of the source device. Accordingly, in this case, the estimated Rx antenna configuration information may be slightly different from the actual Rx antenna configuration information of the source device. For example, antennas having lowest interference with respect to (or antennas farthest from) the detected antenna location of the source device may be treated as Rx antennas. As another example, all antennas capable of performing reception through the network and bandwidth detected with respect to the source device may be treated as receive antennas. At this time, Rx antennas may be automatically distinguished from among multiple antennas by the intelligent device recognition module or the number of Rx antennas may be set to be equal to the number of Rx antennas based on given information.

Recognition Module—Non-Contact-Passive Recognition Method

The passive recognition method means a method of enabling the source device to inform the destination device of the antenna information and/or the network information by direct/indirect user input.

For example, the network configuration information and the antenna configuration information of the source device may be transmitted to the destination device via a program installed in the source device. As another example, the supported network configuration information and antenna configuration information of the source device may be stored in the destination device and the information about the source device may be identified through the identification of the source device. The identification of the source device may be information for uniquely identifying the source device, such as a telephone number, a terminal model name, a serial number, etc. In addition, although information delivery from the source device to the destination device may be performed using any communication method supported by both the source device and the destination device, Wi-Fi, Bluetooth, ZigBee, RFID, NFC, etc. using an unlicensed band are preferably used for convenience.

Recognition Module—Contact Recognition Method

The contact recognition method means a method of delivering antenna and/or network information of the source device via a wired channel in communication between the source device and the destination device. Signal delivery through the wired channel does not mean wired communication, for example, communication using Ethernet, but means transmission of an analog RF signal from the source device.

In this case, the source device and the destination device must include an external port for wired communication. At this time, the destination device must include antenna ports, the number of which is greater than or equal to the number of antenna ports of the source device. In addition, the antenna ports are preferably shielded from each other in the external antenna ports of the source device and the destination device.

Accordingly, the recognition module of the destination device may acquire information about the number of antennas of the source device by measuring receive power of each port in reception of the signal of the source device using a plurality of external antenna ports. This process may be referred to as "antenna port scanning". Antenna port scanning of the destination device may be performed with respect to all networks supported by the destination device.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

It will be apparent to those skilled in the art that various modifications and variations can be made in the present invention without departing from the spirit or scope of the invention. Thus, the present invention is intended to cover the modifications and variations of this invention provided they come within the scope of the appended claims and their equivalents.

MODE FOR INVENTION

Various embodiments have been described in the best mode for carrying out the invention.

INDUSTRIAL APPLICABILITY

The above-described embodiments of the present invention are applicable to various mobile communication systems.

The invention claimed is:

1. A method of transmitting and receiving a multi-input multi-output (MIMO) signal by a destination device in a wireless communication system in which a plurality of communication systems is present, the destination device including a transmitter, a receiver, a processor; a memory and a plurality of antennas, the method comprising:

receiving, by the plurality of antennas of the destination device, a signal from a source device to detect a strength of the signal;

recognizing, by the processor of the destination device, transmit (Tx) antenna information of the source device by comparing the signal strength with information pre-stored in the memory;

estimating, by the processor of the destination device, information about receiving (Rx) antennas of the source device from the recognized Tx antenna information such that antennas having a lowest interference with respect to a recognized Tx antenna location of the source device are regarded as the Rx antennas of the source device;

transmitting and receiving, by the transmitter and the receiver of the destination device, MIMO signals with the source device based on the recognized Tx antenna information and the estimated information about the Rx antennas of the source device.

2. The method according to claim 1, wherein the pre-stored information includes at least one of Tx antenna information including at least one of an antenna type applicable to the source device, antenna geometry, a number of antennas of the source device, an antenna location or antenna gain of the source device.

3. The method according to claim 1, wherein the recognized Tx antenna information includes at least one of an antenna type of the source device, an antenna geometry of the source device, a number of antennas of the source device, an antenna location or an antenna gain of the source device.

4. The method according to claim 3, further comprising decoding or demodulating a baseband signal according to a network type.

5. The method according to claim 1, further comprising determining an antenna to perform communication with the source device from among the plurality of antennas based on the recognized Tx antenna information.

* * * * *